Dec. 12, 1967 D. WRAY, JR 3,357,390

HYDROFOIL CRAFT

Filed Aug. 30, 1965 4 Sheets-Sheet 1

INVENTOR
DAVID WRAY, JR.

BY Hans G. Hoffmeister.
ATTORNEY

INVENTOR
DAVID WRAY, JR.

BY Hans G. Hoffmeister
ATTORNEY

INVENTOR
DAVID WRAY, JR.

BY Hans G. Hoffmeister
ATTORNEY

Dec. 12, 1967 D. WRAY, JR 3,357,390

HYDROFOIL CRAFT

Filed Aug. 30, 1965 4 Sheets-Sheet 4

INVENTOR
DAVID WRAY, JR.

BY Hans G. Hoffmeister

ATTORNEY 3,357,390
HYDROFOIL CRAFT
David Wray, Jr., Los Gatos, Calif., assignor to FMC Corporation, San Jose, Calif., a corporation of Delaware
Filed Aug. 30, 1965, Ser. No. 483,621
7 Claims. (Cl. 114—66.5)

This invention relates to hydrofoil craft and more particularly concerns an improved foil system for such craft.

Many factors must be considered in the design of a hydrofoil craft if the craft is to have the stability, speed, maneuverability, and riding characteristics that are necessary for use as a means of transporting people over water. Further, the design features that improve one operating characteristic, such as heave stiffness, tend to worsen other operating characteristics such as transverse stability or lift-to-drag ratio. While several hydrofoil boats have been proposed and some have been put into operation, they have varied widely in their design so that no guideposts have been established for coordinating the various components of a hydrofoil craft to produce a reliable boat.

Accordingly, it is an object of the present invention to provide an improved, reliable hydrofoil craft.

Another object is to provide an improved foil system for a hydrofoil craft.

Another object is to provide a foil system for a hydrofoil boat wherein the design characteristics, such as dihedral angle, sweep angle, and foil configuration are so coordinated that the boat performs entirely satisfactory at high speeds in both smooth and rough seas.

Other and further objects and advantages will be apparent from the following description taken in connection with the accompanying drawings, in which.

Figures 4, 5, 6:
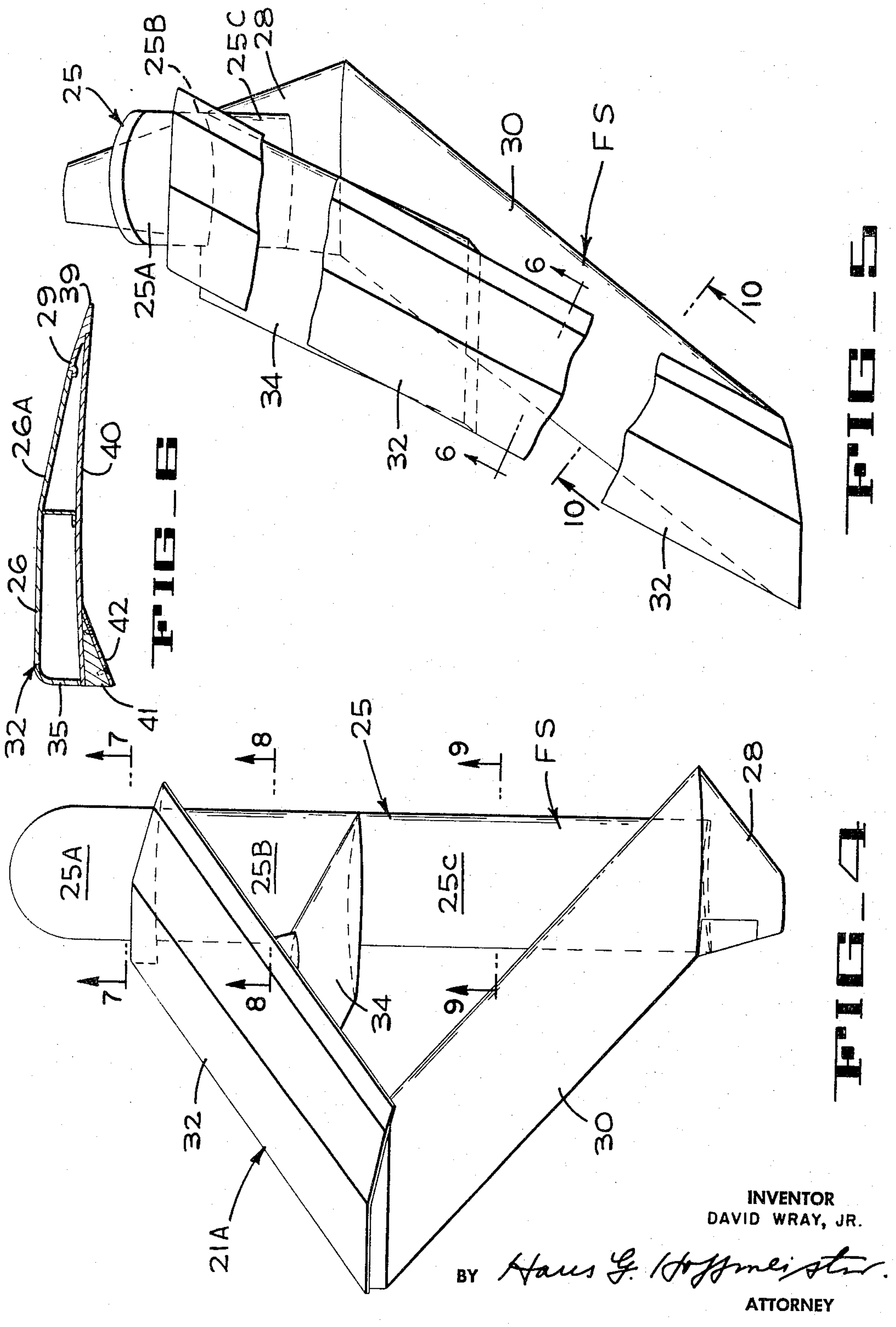
FIGURE 4 is an enlarged side elevation of one of the foils shown in FIG. 2.
FIGURE 5 is an enlarged plan, with parts broken away, of the foil of FIG. 4.
FIGURE 6 is an enlarged diagrammatic section taken along lines 6—6 of FIG. 5.
Figure 7:
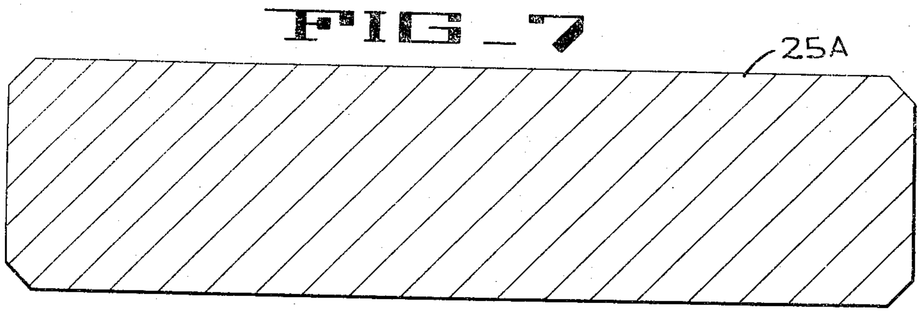
Figure 8:
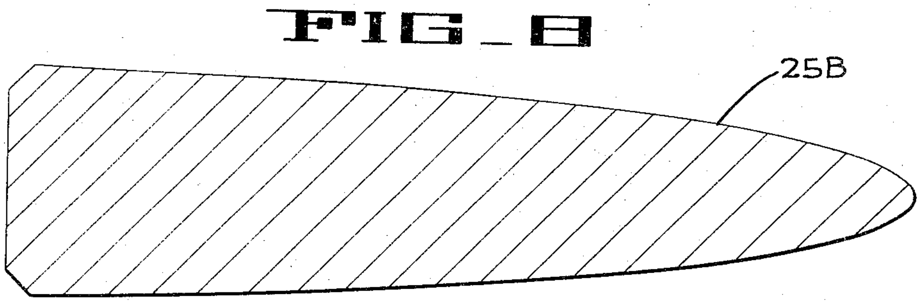
Figure 9:
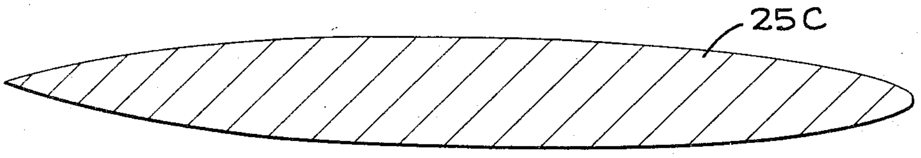

FIGURES 7, 8 and 9 are enlarged diagrammatic sections taken along lines 7—7, 8—8 and 9—9 respectively of FIG. 4.

Figure 10:
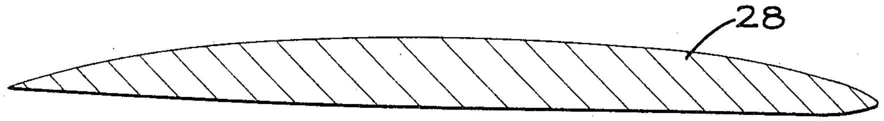

FIGURE 10 is an enlarged diagrammatic section taken along line 10—10 of FIG. 5.

Figure 3:
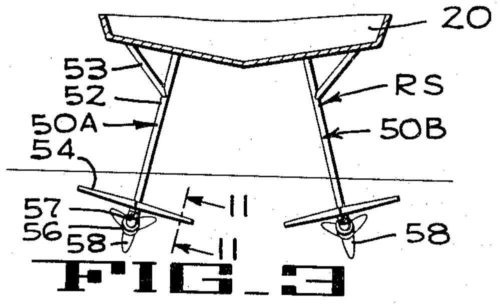
FIGURE 3 is an enlarged diagrammatic section taken along lines 3—3 of FIG. 2.
Figure 11:
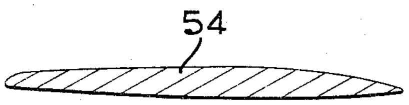

FIGURE 11 is an enlarged diagrammatic section taken along line 11—11 of FIG. 3.

Figure 12:
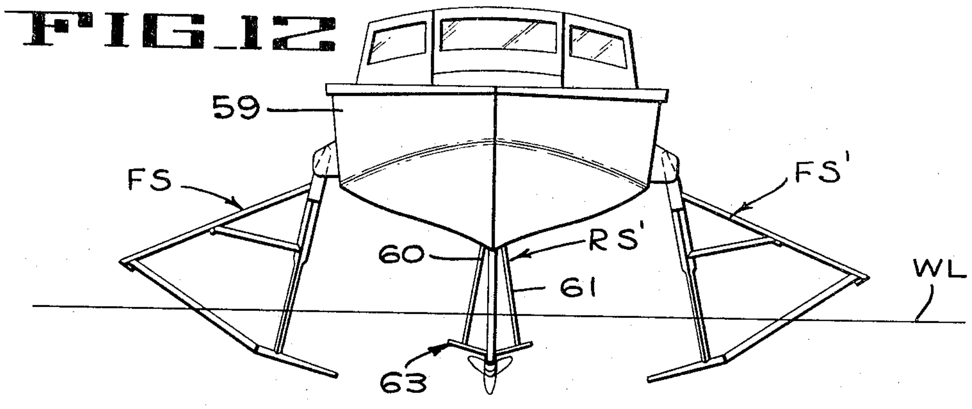

FIGURE 12 is a diagrammatic front elevation of a second embodiment of the hydrofoil craft of the present invention.

Figure 13:
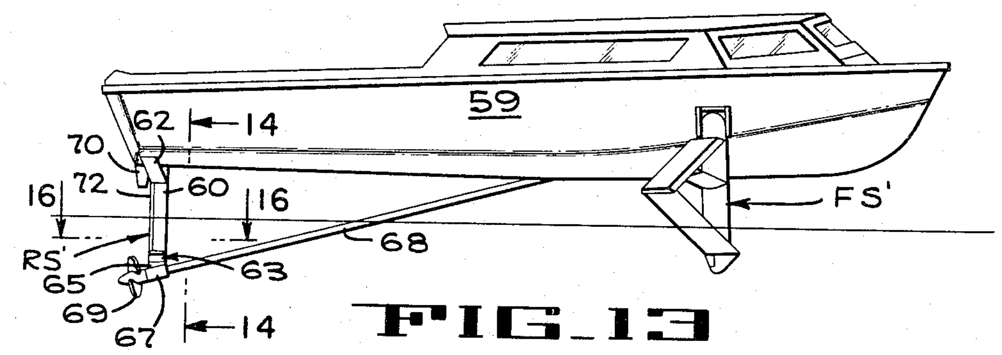

FIGURE 13 is a diagrammatic side elevation of the boat of FIG. 12.

Figure 14:
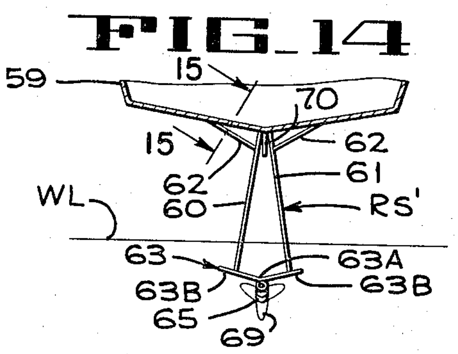

FIGURE 14 is an enlarged diagrammatic section taken along lines 14—14 of FIG. 13.

Figure 15:
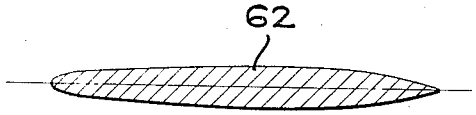

FIGURE 15 is an enlarged diagrammatic section taken along line 15—15 of FIG. 14.

Figure 16:
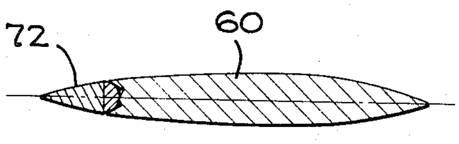

FIGURE 16 is an enlarged diagrammatic section taken along line 16—16 of FIG. 13.

Figure 17:
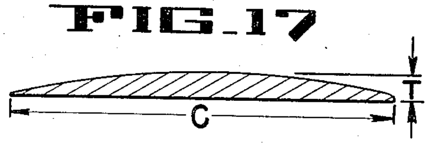

FIGURE 17 is a diagrammatic section of a second basic foil shape that may be used in the foil system of the present invention.

Figure 1:
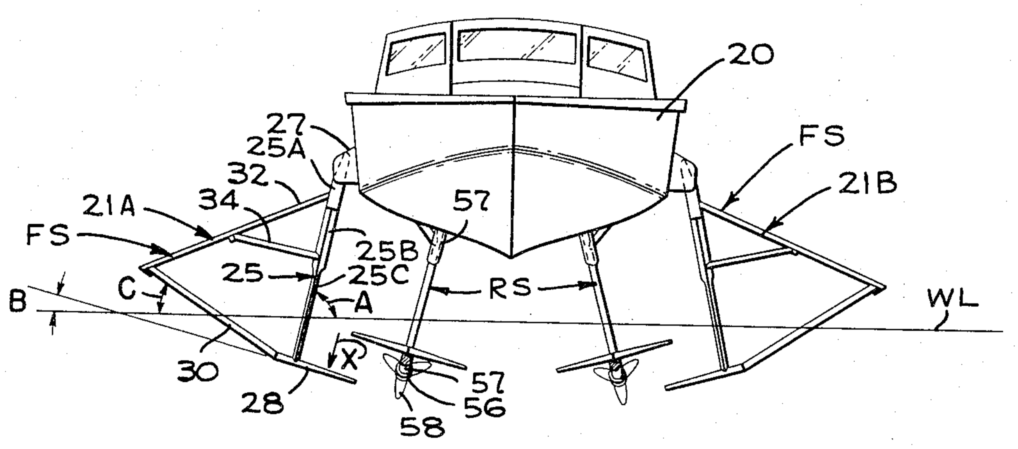
FIGURE 1 is a diagrammatic front elevation, with parts broken away, of a hydrofoil craft constructed in accordance with the teaching of the present invention.
Figure 2:
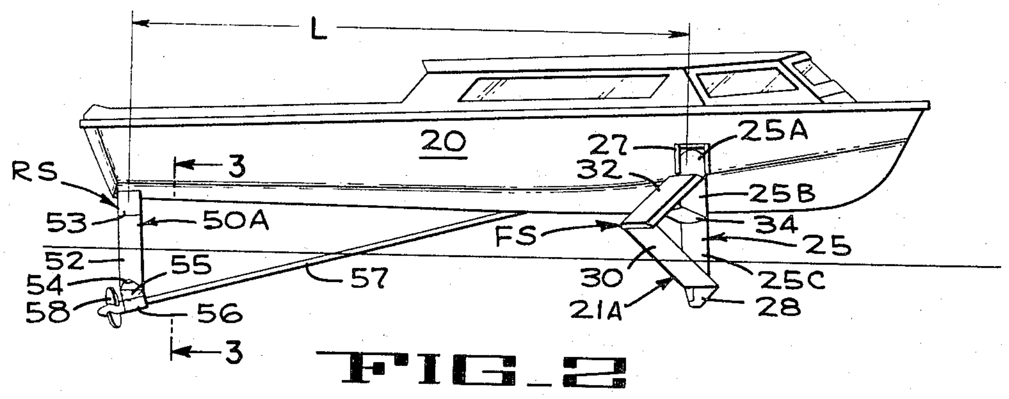
FIGURE 2 is a diagrammatic side elevation of the boat of FIG. 1.

The embodiment of the present invention chosen for illustration in FIGS. 1 and 2 comprises a hull 20 having a forward foil system FS and a rear system RS.

The forward system FS includes foil assemblies 21A and 21B disposed on opposite sides of the hull. Since the two foil assemblies are identical, but are oppositely oriented relative to the hull, the assembly 21A, only, will be described in detail. The assembly 21A includes a strut 25 that is rigidly secured near its upper end to a pivot housing 27 which extends outwardly from the side of the hull. A main foil 28 is secured by screws to the lower end of the strut 25, and a wing foil 30 extends upwardly and outwardly from the outer end of the main foil. As seen in FIG. 4, the wing foil 30 also projects rearwardly at a predetermined sweep-back angle. At its upper, outer end, the wing foil is screwed to a brace 32 which is screwed at its inner end to an upper portion 25A of the strut 25. A ladder foil 34 is connected between an intermediate portion of the brace 32 and an intermediate portion of the strut 25.

The strut 25 has an 18 inch streamwise chord along its length and the upper end 25A has a rectangular cross-section, being about 4.5 inches thick as shown in FIG. 7 while the portion 25B of the strut, between the points of connection of the brace 32 and the ladder foil 34, has the cross-section shown in FIG. 8. The strut portion 25C, between the ladder foil connection and the lower end of the strut, has the stream-lined cross-section shown in FIG. 9 which is a NACA (National Advisory Committee on Aeronautics) section No. 16012. The thickness ratio of this section may be varied from a thickness equal to 8% of the chord to a thickness equal to 16% of the chord. Accordingly, any of the NACA sections in the group from No. 16008 to No. 16016 inclusive may be used.

The main foil 28, the wing foil 30, and the ladder foil 34 have the same general cross-sectional configuration, and this configuration is shown in FIG. 10. These foils are of the No. 16000 NACA series and have a camber of from .2 to .6 and a thickness ratio of from 5% to 10% of the chord. Thus any foil in the group from NACA No. 16205 to 16610, inclusive, can be used. The foil illustrated schematically in FIG. 10 is a No. 16508 section.

The cross-section of the brace 32 is shown in FIG. 6. The brace is a super-ventilating foil which is specifically designed to operate ventilated with a large cavity over its top and base, and includes a relatively flat rear face 35, and three flat top wall members 26, 26A and 29, the forwardmost member being joined at a relatively sharp intersection 39 with the forward edge of a slightly concave bottom wall 40. A plate 41 of triangular cross-section is secured to the rear portion of the bottom wall 40 and a relatively thin face plate 42 is secured to lower surface of plate 41.

The main foil 28 has a streamwise chord that tapers from 26 inches to 8 inches over a length of approximately 40 inches. The streamwise chords of the ladder foil 34, the wing foil 30, and the brace 32 are 26 inches.

The rear foil system RS comprises two foil assemblies 50A and 50B (FIG. 3). Since the two foil assemblies are identical, only oppositely disposed relative to the longitudinal centerline of the hull, a description of assembly 50A will be sufficient to disclose the construction of assembly 50B also. Foil assembly 50A comprises a strut 52 that has a 17 inch streamwise chord and is secured by screws at its upper end to the hull. A ladder foil 53, which has a 10 inch streamwise chord, is secured to the hull and to the upper portion of the strut, while a rear main foil 54 is secured to the lower end of the strut. The foil 54 extends 28 inches outwardly on each side of the vertical axis of the strut 52, and on each side it tapers from a chord of 17 inches at said axis to a chord of 5 inches. A short foil section 55 (FIG. 2) projects downward from the central portion of the main foil 54 and carries a bearing support 56 at its lower end. A propeller shaft 57 extends through the support 56 and upwardly through the hull for connection to an engine mounted inside the hull. A propeller 58 is keyed to the shaft 57.

The strut 52 has a No. 16012 NACA section. However, one may vary the thickness ratio and still obtain suitable performance and, accordingly, any section in the group from NACA No. 16008 to No. 16012 inclusive may be used. The ladder foil 53 has a No. 16010 NACA section. Again, the thickness ratio may be varied, and any foil in the group from NACA No. 16004 to No. 16016 inclusive may be used. The main foil 54 is a NACA No. 16308 section which is shown schematcially in FIG. 11. For this foil, the camber may be varied from 1 to 6 and the thickness ratio may be varied from a thickness that is 5% of the chord to a thickness that is 15% of the chord. Accordingly, any NACA section in the group of from No. 16105 to No. 16615 inclusive may be used.

Referring again to the forward foil section FS, it will be noted that the strut 25 (FIG. 1) is canted from an assumed to be level water line WL an angle A of 77 degrees. This angle may be varied from 50 to 90 degrees. The dihedral angle B of the main foil 28, which is illustrated as being about 17°, may be varied from 0 to 30 degrees. The dihedral angle C of the wing foil 30 may range from 15 to 50 degrees, and is illustrated as being about 35 degrees. The dihedral angle of the ladder foil 34, which is shown as being about 13 degrees relative to the water line WL, may be in the range of from 0 to 50 degrees. The brace 32 shown in FIG. 1 has a dihedral angle of about 22 degrees. This angle may vary from 0 to 50 degrees. All of the above angles refer to the angle the base plane of the foil makes with the water line.

Referring to FIG. 2 it will be noted that certain of the foils of the forward foil system are swept back. All sweep angles listed herein are given with reference to the base plane of the foil and, in each case, the angle would be the angle that a line at 50% of the chord would make with the longitudinal axis of the hull if seen by a person looking downwardly in a direction at right angles to the base plane of the foil. For example, looking at the main foil 28 in the direction of arrow X (FIG. 1) the foil 28 has a sweep angle of 7 degrees. This angle may be varied from 0 to 30 degrees. The wing foil 30 shown in FIG. 2 has a sweep angle of 35 degrees, and this angle may be varied within the range of 0–40 degrees. The sweep angle of the ladder foil 34 may be in the range of 0–40 degrees, and is illustrated as being about 27 degrees. In FIG. 2 the sweep angle of the brace 32 is shown as being about 25 degrees. This angle may vary within the range of from 0–40 degrees. As seen in FIG. 2, the strut 25 is swept forwardly at an angle of about 1.5 degrees. This angle may vary from a 5 degree forward sweep angle to a 5 degree back sweep angle.

In the rear foil system RS, the strut 52 (FIG. 3) has a dihedral angle of 75 degrees relative to the water line, and a sweep angle of zero. The dihedral angle may vary in the range of from 90–50 degrees, and the sweep angle may vary from a 5 degree forward sweep angle to a 5 degree back sweep angle. The ladder foil 53 has a dihedral angle of 53 degrees, and a zero sweep angle. This dihedral angle may vary from 0 to 50 degrees inclusive, and the sweep angle may vary from zero to a sweep back angle of 40 degrees inclusive. The main foil 54 has a dihedral of 15 degrees and a sweep back angle of 7 degrees. The dihedral of foil 54 may vary in the range of 0–50 degrees, and the sweep angle from a zero angle to a sweep back angle of 40 degrees inclusive.

The angle of incidence of all the foils of the front and rear systems may be in the range of from 0–5 degrees.

At rest, the boat is of course supported on the hull. When the boat is driven forwardly by the propellers and reaches a speed of about 10 knots, the forward foil system starts to take effect and at about 14 knots the stem of the boat starts to clear the water line. At 16 knots, the front foils are continuing to lift the forward end of the boat, and the rear foil system begins to lift the rear portion of the boat. At about 18 knots the boat has attained a maximum nosed up angle, and at about 23 knots the last bit of the hull leaves the water and the boat moves to the flying position shown in FIG. 2.

It will be evident that during take-off the brace 32, the ladder 34, the strut 25 and the wing foil 30 act as surface-piercing foils which provide a lifting effect that is reduced as these members emerge entirely or partially from the water. A portion of the wing foil 30 and all of the main foil 28 will always remain submerged to provide support for the boat.

The strut 25, the ladder foil 34, the wing foil 30 and the main foil 28 operate fully wetted, except for the portion 25A of the strut 25 which is in the water at moderate speeds and operates as a base ventilated foil. As previously mentioned, the brace 32 is a super-ventilating design that operates, when in the water, with a large cavity over its top surface and adjacent its rear wall. This foil provides reliable lift action when the boat tends to pitch or to roll, that is, to pivot about a transverse or longitudinal horizontal axis through its center of gravity. Thus, if the boat suddenly rolls, heaves or swings downwardly the braces 32 become submerged and immediately provide a lifting action that will raise the boat. Accordingly the braces of the present design provide a key instrumentality for attaining safe operation in rough waters.

It should be noted that the rear main foils 54 also remain submerged at all times.

A second embodiment of the hydrofoil craft of the present invention is shown in FIGS. 12–14 and, in general, comprises a hull 59 having a forward foil system FS′ and a rear foil system RS′. The forward system FS′ is identical to the system FS described above, having the same critical configurations and angles.

The rear foil system RS′ includes a pair of struts 60 and 61 (FIG. 14), a ladder foil 62 extending between each strut and the bottom of the hull, and a main foil 63 that is screwed to the lower ends of the struts 60 and 61 and has a smoothly curved central portion 63A and two upwardly inclined wings 63B. Each strut has a 7.5 inch streamwise chord and has a No. 16012 section, as shown in FIG. 16. Any foil in the group of NACA No. 16008–No. 16016 may be used. Each ladder foil 62 has a 6.5 inch streamwise chord and a NACA No. 16008 section, as shown in FIG. 15. This section may be varied from a NACA No. 16004–No. 16016. The main foil 63 has an NACA No. 16308 section, which is shown schematically in FIG. 11, and has a streamwise chord of about 7.75 inches. Any section in the group of NACA No. 16105–16615 may be used for this foil.

The struts 60 and 61, as shown in FIG. 14, have a dihedral angle relative to the water line WL of about 75 degrees. This angle may be varied in the range of from 90–50 degrees. The ladder foils 62 have a dihedral angle of 30 degrees. This angle may be varied within the range of from 15–45 degrees. The wings 63B of the main foil 63 have a dihedral of 15 degrees, and this angle may be varied from 0 to 50 degrees, inclusive.

The struts 60 and 61 are illustrated as having a zero sweep angle but they may have sweep angles in the range of from a 5 degree sweep back angle to a 5 degree forward sweep angle. The ladder foils 62 have a 15 degree sweep back angle, which may be varied from 0–40 degrees. The main foil 63 has a zero sweep angle.

A short foil section 65 (FIG. 13) extends downwardly from the central portion of the main foil 63. This foil 65 has an NACA No. 16012 section, and carries a bearing support 67 at its lower end. A propeller shaft 68 extends through the bearing support and through the hull for connection to an engine inside the hull, and a propeller 69 is keyed to the propeller shaft. A main rudder 70 (FIG. 13) is mounted on the hull immediately behind the rear foil system, and an auxiliary rudder 72 is formed on the rear edge of each strut 60 and 61. Each auxiliary rudder is formed as part of the NACA section, as shown in FIG. 16, and is pivotally connected to the main portion of the strut by means of a plurality of hinges (not shown). Suitable means are provided in the boat for actuating the rudders to steer the boat.

The foil systems described above are based on the use of a NACA No. 16000 series section being used. Comparable performance can be obtained in the boats of FIG. 1 and FIG. 12 if ogival foils of equivalent camber be substituted for the No. 16000 series foils previously mentioned and/or, if symmetrical ogival struts with equivalent thickness ratio be substituted for the portions of the struts having No. 16000 series sections. In FIG. 17 a cross-section of a typical ogival lifting foil or ladder foil is illustrated, wherein the reference letter C indicates the chord and the letter T between the flat undersurface and the circular arc top surface of the foil represents the thickness ratio. Thus, in a foil having, for example, an 8% thick ogive, the dimension T would be 8% of C. The camber of such a foil would be 0.4. Such an ogival foil would be comparable in performance to a NACA No. 16408 section.

Refering to FIG. 2, the dimension L indicates approximately the distance between the center of lift of the rear foil system and the center of lift of the forward foil system. The center of gravity of the boats of FIGS. 2 and 13, must be spaced orwardly from the center of lift of the rear foil system a distance within the range of from 60%–80% of L. In the claims the distances between the foil systems and between the center of gravity of the boat and the center of lift of the rear foil system will be referred to, for convenience, as distance relative to the foil systems themselves rather than relative to the centers of lift.

From the foregoing description it will be seen that the present invention discloses foil systems having design characteristics which are critical for a hydrofoil craft wherein the center of gravity of the boat is spaced from the rear foil system a distance within the range of from 60–80% of the distance between the foil systems. Accordingly, if the specified fore and aft foil systems are used, if the specified NACA No. 16000 series sections or the equivalent ogival sections are used, and if the dihedral angles and the sweep angles are maintained within the specified ranges, a boat having operating characteristics within recognized standards for acceptable performance with respect to heave, sway, surge, pitch, roll, and yaw will be produced.

Having thus described my invention, what I claim as new and desire to protect by Letters Patent is:

1. A hydrofoil craft comprising a hull, and a forward and an aft foil system depending from said hull; said forward foil system comprising a foil unit on each side of said hull, each forward foil unit including a plurality of ogival lifting foils each having a flat undersurface and one ventilating brace; said aft foil system comprising a plurality of struts, a ladder foil extending between each strut and the hull, and a main foil secured to the lower end of each strut, all of said aft foils being ogival foils each having a flat undersurface.

2. A hydrofoil craft comprising a hull, and a forward and an aft foil system depending from said hull, said forward foil system comprising a foil unit on each side of the longitudinal centerline of said hull, each forward foil unit including a plurality of ogival lifting foils each having a flat undersurface and one super-ventilating brace; said aft foil system comprising a foil unit on each side of said hull, all operating foils of each aft unit being ogival foils each having a flat undersurface.

3. A hydrofoil craft comprising a hull, and a forward and an aft foil system depending from said hull; said forward foil system comprising a foil unit on each side of the longitudinal centerline of said hull; each forward foil unit including a strut in the group from NACA No. 16008–No. 16016, a main foil in the group from NACA No. 16205–16610, a wing foil and a ladder foil in the group from NACA No. 16205–16610, and a super-ventilating brace connected between said strut and said wing foil; said aft foil system including a foil unit on each side of said hull; each aft foil unit comprising a rear strut in the group from NACA No. 16008–No. 16016, a ladder foil connected between said rear strut and the hull and having a section in the group from NACA No. 16004–No. 16016, and a main foil secured transversely across the lower end of said strut, said main foil having a section in the group of from NACA No. 16105–No. 16615.

4. A hydrofoil craft comprising a hull, and a forward and an aft foil system depending from said hull; said forward foil system comprising a foil unit on each side of said hull; each forward foil unit including a strut in the group from NACA No. 16008–No. 16016 having a dihedral angle in the range of from 50–90 degrees and a sweep angle of from 5 degrees sweep back to 5 degrees forward sweep, a main foil in the group from NACA No. 16205–16610 having a dihedral angle of from 0–30 degrees and a sweep back angle of from 0–30, a wing foil in the group from NACA No. 16205–No. 16610 having a dihedral angle of from 15–50 degrees and a sweep back angle of from 0–40 degrees, a ladder foil in the group from NACA No. 16205–16610 having a dihedral angle of from 15–50 degrees and a sweep back angle of from 0–40 degrees, and a super-ventilating brace having a dihedral angle of from 0–50 degrees and a sweep angle of from 0–40 degrees; said aft foil system including struts in the group from NACA No. 16008–No. 16016, ladder foils in the group from NACA No. 16004–No. 16016, and main foils in the group from NACA No. 16105–16615; the center of gravity of said boat being spaced from the aft foil system a distance within the range of from 60%–80% of the distance between said forward and aft foil systems.

5. A hydrofoil craft comprising a hull, and a forward and an aft foil system depending from said hull; said forward foil system comprising a foil unit on each side of said hull; each forward foil unit including a strut in the group from NACA No. 16008–No. 16016 having a dihedral angle in the range of from 50–90 degrees and a sweep angle of from 5 degrees sweep back to 5 degrees forward sweep, a main foil in the group from NACA No. 16205–16610 having a dihedral angle of from 0–30 degrees and a sweep back angle of from 0–30, a wing foil in the group from NACA No. 16205–No. 16610 having a dihedral angle of from 15–50 degrees and a sweep back angle of from 0–40 degrees, a ladder foil in the group from NACA No. 16205–16610 having a dihedral angle of from 15–50 degrees and a sweep back angle of from 0–40 degrees, and a super-ventilating brace having a dihedral angle of from 0–50 degrees and a sweep angle of from 0–40 degrees; said aft foil system including a pair of struts in the group from NACA No. 16008–No. 16016 having a dihedral angle in the range from 50–90 degrees and a sweep angle of from 5 degrees sweep back to 5 degrees forward sweep, a pair of ladder foils in the group from NACA No. 16004–No. 16016 having a dihedral angle in the range from 15–45 degrees and a sweep angle of from 0–40 degrees sweep back, and a main foil in the group from NACA No. 16105–16615 having a dihedral angle of from 0–50 degrees and a sweep angle of zero; the center of gravity of the boat being spaced from the rear foil system a distance within the range of from 60%–80% of the distance between said forward foil system and said aft foil system.

6. A hydrofoil craft comprising a hull, and a forward and an aft foil system depending from said hull; said forward foil system comprising a foil unit on each side of said hull; each forward foil unit including a strut in the group from NACA No. 16008–No. 16016 having a dihedral angle in the range of from 50–90 degrees and a sweep angle of from 5 degrees sweep back to 5 degrees forward step, a main foil in the group from NACA No. 16205–16610 having a dihedral angle of from 0–30 degrees and a sweep back angle of from 0–30, a wing foil in the group from NACA No. 16205–No. 16610 having a dihedral angle of from 15–50 degrees and a sweep back angle of from 0–40 degrees, a ladder foil in the group from NACA No. 16205–16610 having a dihedral angle of from 15–50 degrees and a sweep back angle of from 0–40 degrees, and a super-ventilating brace having a dihedral angle of from 0–50 degrees and a sweep angle of from 0–40 degrees; said aft foil system including a pair of struts in the group from NACA No. 16008–No. 16016 having a dihedral angle in the range from 50–90 degrees and a sweep angle of from 5 degrees sweep back to 5 degrees forward sweep, a pair of ladder foils in the group from NACA No. 16004—No. 16016 having a dihedral angle of from 0–50 degrees and a sweep angle of from 0–40 degrees sweep back, and a pair of main foils in the group from NACA No. 16105-No. 16615 having a dihedral angle of from 0–50 degrees and a sweep back angle of from 0–40 degrees; the center of gravity of the boat being spaced from the aft foil system a distance within the range of from 60%–80% of the distance between said forward and aft foil systems.

7. A hydrofoil craft comprising a hull, and a forward and an aft foil system depending from said hull; said forward foil system comprising a foil unit on each side of the longitudinal centerline of said hull; each forward foil unit including a symmetrical ogival strut with a thickness ratio from 8% to 16%, an ogival main foil with a thickness ratio from 5% to 10%, an ogival wing foil and an ogival ladder foil having a thickness ratio from 5% to 10%, and a super-ventilating brace connected between said strut and said wing foil; said aft foil system including a foil unit on each side of said hull; each aft foil unit comprising a symmetrical ogival rear strut having a thickness ratio from 8% to 16%, an ogival ladder foil connected between said rear strut and the hull and having a thickness ratio from 4% to 16%, and an ogival main foil secured transversely across the lower end of said strut, said main foil having a thickness ratio from 5% to 15%, all of said ogival foils having a flat undersurface and an upper surface defining a circular arc.

References Cited

UNITED STATES PATENTS

| | | | |
|---|---|---|---|
| 2,914,014 | 11/1959 | Carl et al. | 114—66.5 |
| 3,065,723 | 11/1962 | Tulin | 114—66.5 |
| 3,077,173 | 2/1963 | Lang | 114—66.5 |
| 3,191,567 | 6/1965 | Ask | 114—66.5 |

OTHER REFERENCES

Hovering Craft and Hydrofoil, London, monthly periodical, March 1966, by C. Beason and A. K. Buckle, p. 5 (article appears on pp. 4–25 of magazine).

ANDREW H. FARRELL, *Primary Examiner.*

MILTON BUCHLER, *Examiner.*